United States Patent

Garnett

[11] 3,926,055
[45] Dec. 16, 1975

[54] MECHANICAL SPAN AND ZERO ADJUSTMENT APPARATUS FOR PRESSURE TRANSDUCERS

[75] Inventor: Lawrence Taylor Garnett, Fullerton, Calif.

[73] Assignee: International Telephone & Telegraph Corporation, New York, N.Y.

[22] Filed: Oct. 1, 1973

[21] Appl. No.: 402,336

[52] U.S. Cl. .............................. 73/398 AR; 73/407
[51] Int. Cl.² ........................................ G01L 7/08
[58] Field of Search ....... 73/407, 398 AR, 408, 393, 73/397, 406, 1; 92/97, 104, 130, 131, 133

[56] References Cited
UNITED STATES PATENTS

| 2,561,700 | 7/1951 | Hughes ................................. 73/397 |
| 2,729,104 | 1/1956 | Shuck et al. ......................... 73/397 |
| 3,077,772 | 2/1963 | Rogers et al. ..................... 73/141 A |
| 3,104,546 | 9/1963 | Hauptman ........................... 73/397 |
| 3,136,130 | 6/1964 | McGay ................................. 92/131 |
| 3,160,007 | 12/1964 | Tate et al. ........................ 73/407 R |
| 3,343,420 | 9/1967 | Kondo et al. .................... 73/398 AR |
| 3,646,815 | 3/1972 | Martin et al. ........................ 73/393 |

Primary Examiner—Jerry W. Myracle
Assistant Examiner—Marcus S. Rasco
Attorney, Agent, or Firm—A. Donald Stolzy

[57] ABSTRACT

A diaphragm differential pressure unit having range springs and a zero spring to bias the diaphragms. One end of each range spring is fixed relative to the centers of the diaphragms. The other ends of the springs may be clamped to or unclamped from the unit body independently in any combination to increase or to decrease, respectively, the biasing force on the diaphragms. The force constants of four range springs are weighted thus: $2^1k$, $2^2k$, $2^3k$ and $2^4k$, respectively, where $k$ is nominally 62.5 pounds per inch. The zero spring is an adjustable spiral spring having a force constant at least of an order of magnitude lower than that of the $2k$ range spring. It is an outstanding advantage that the springs prevent the amplification of mechanical inaccuracies for different spring combinations and adjustments.

28 Claims, 31 Drawing Figures

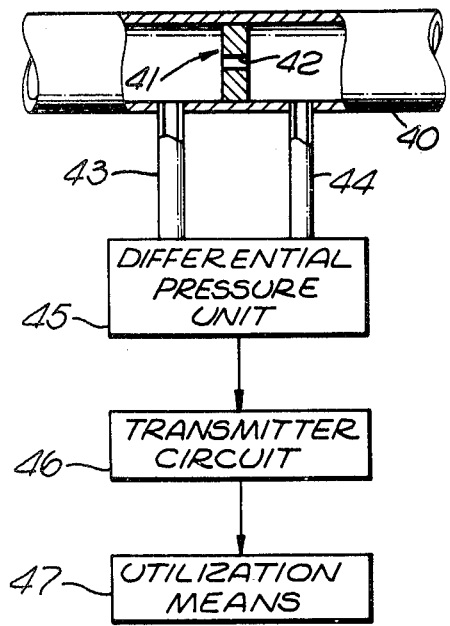
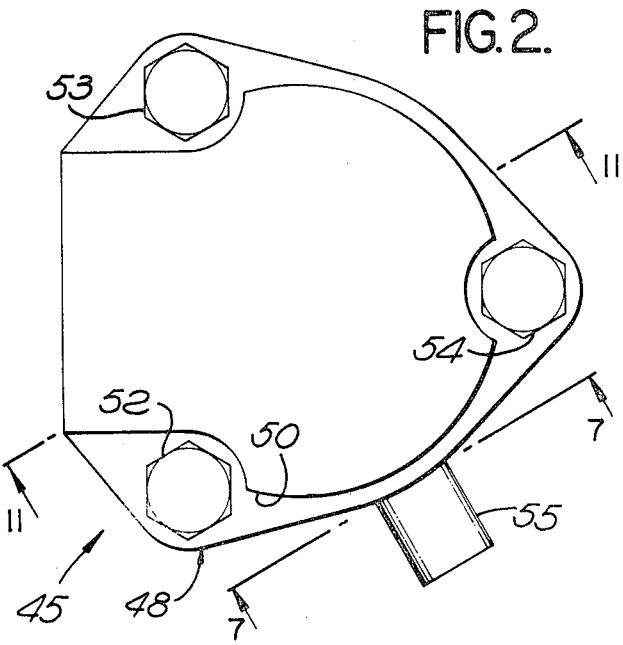
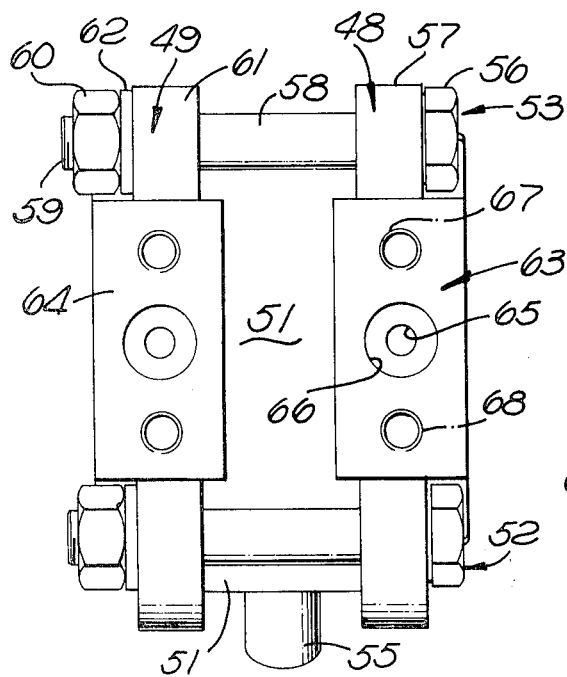
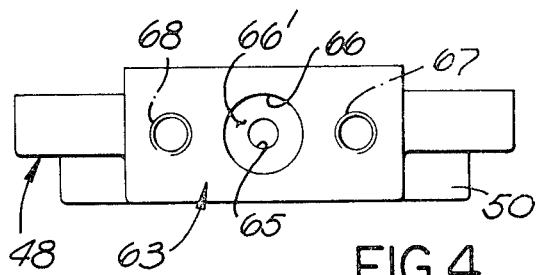
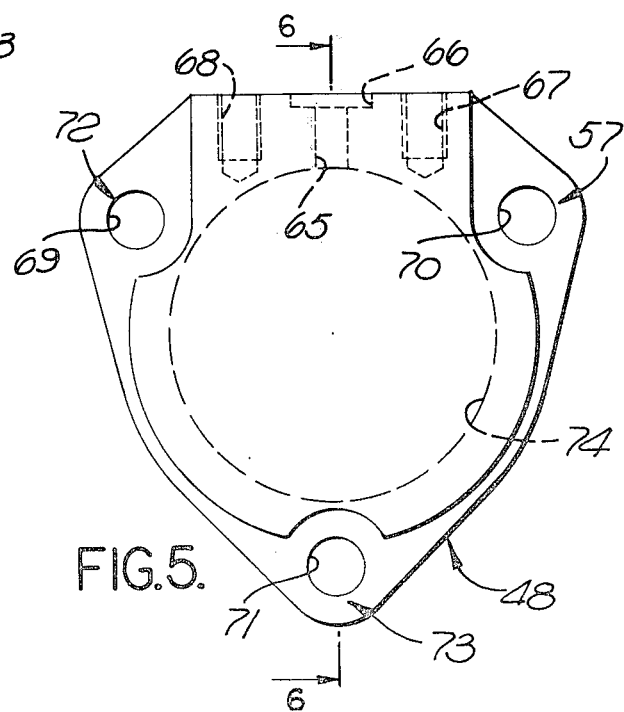

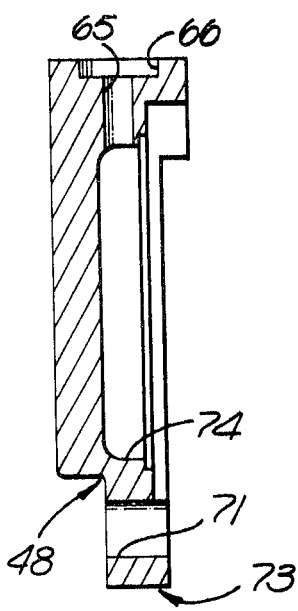
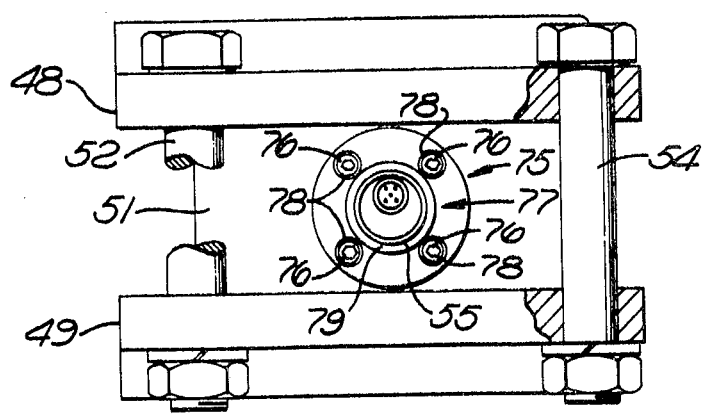
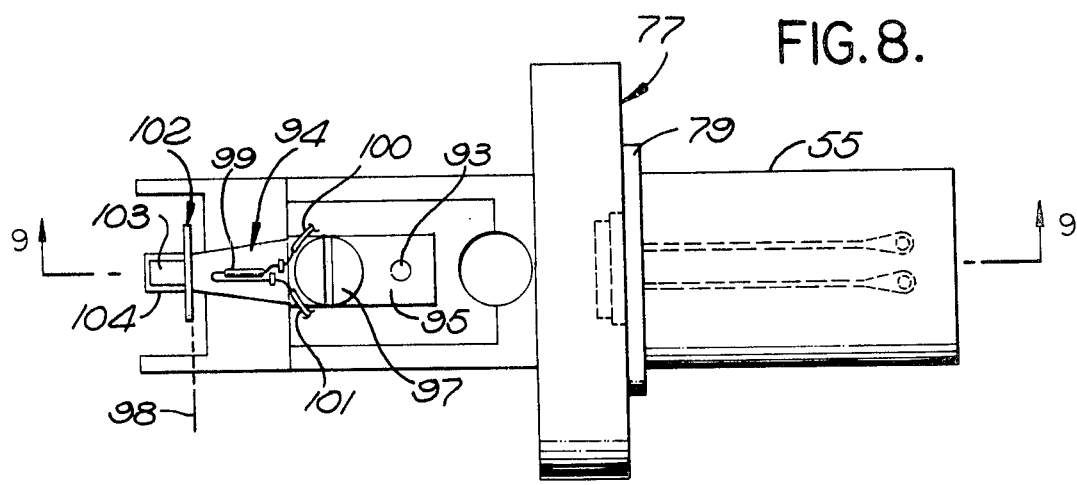
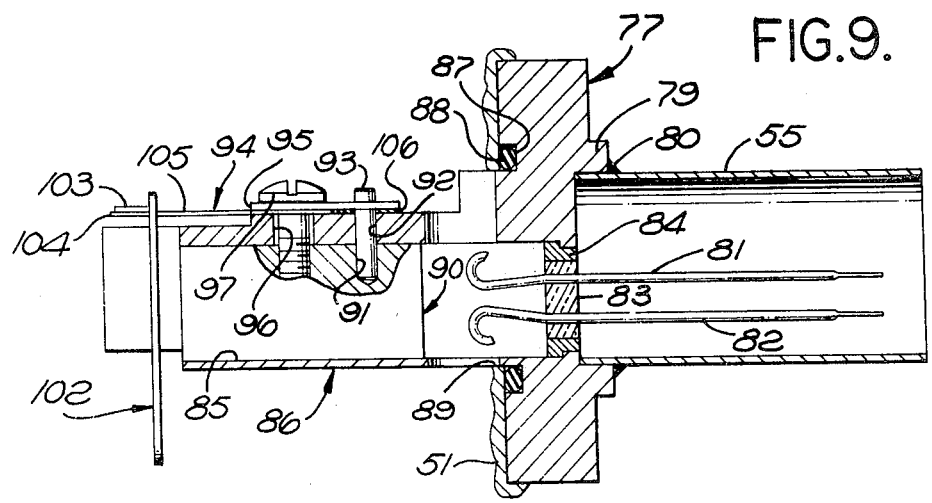

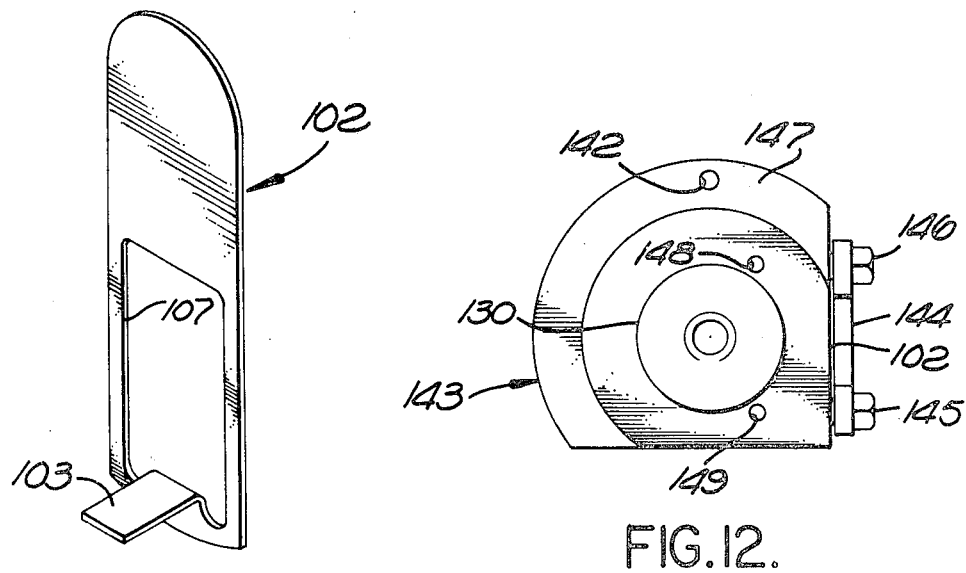
FIG.10.
FIG.12.
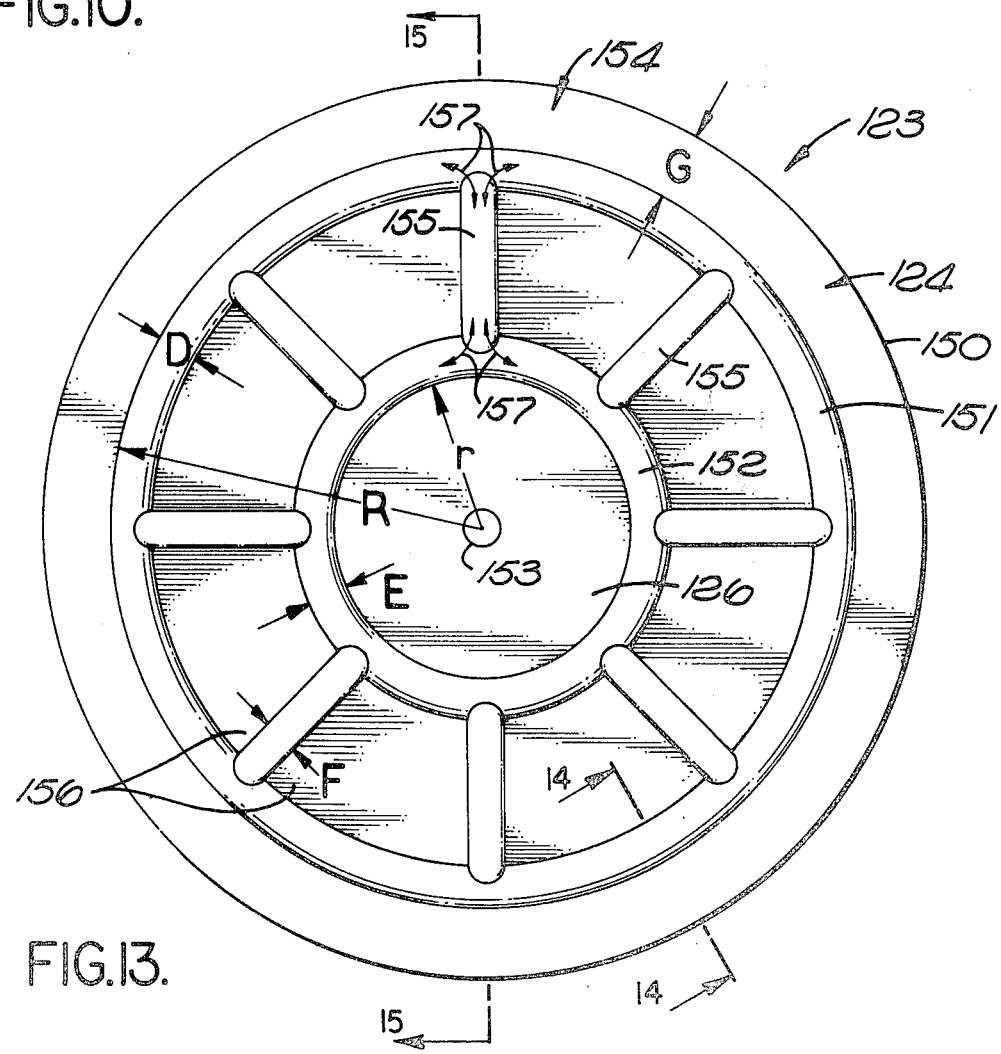
FIG.13.

FIG. 11.

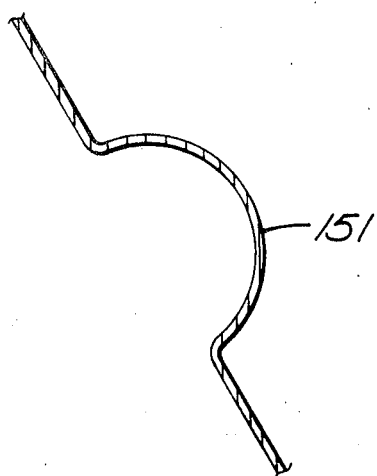
FIG. 14.
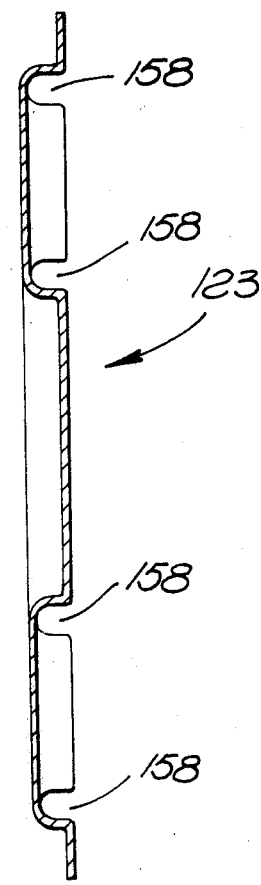
FIG. 15.
FIG. 16.
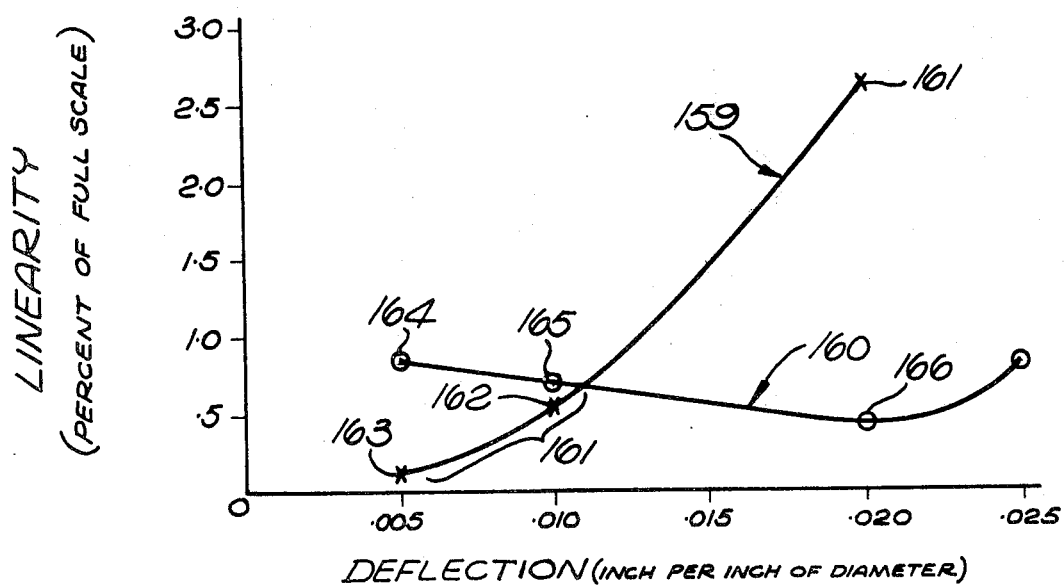

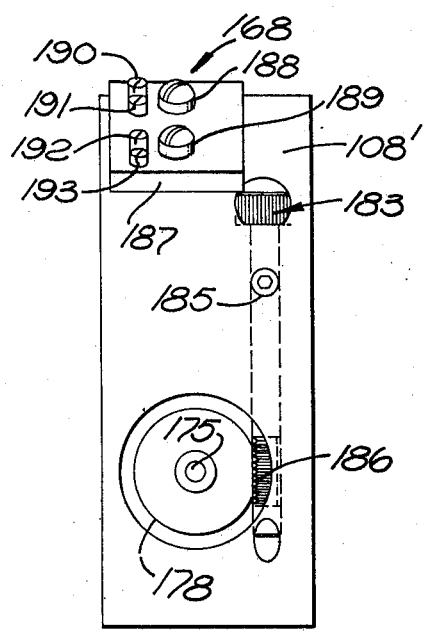
FIG.21.
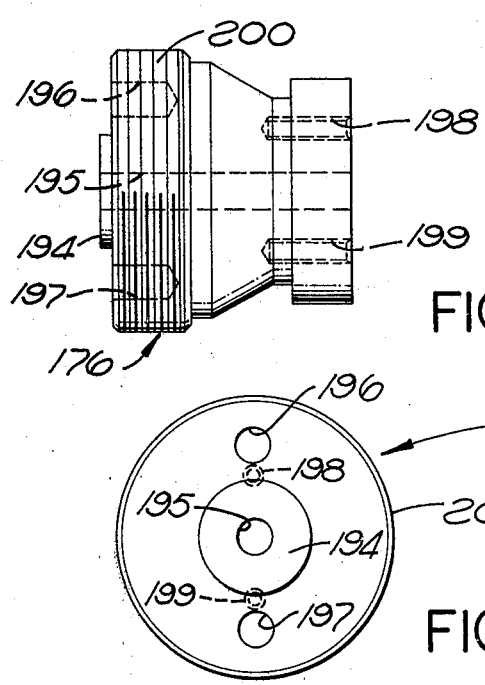
FIG.22.
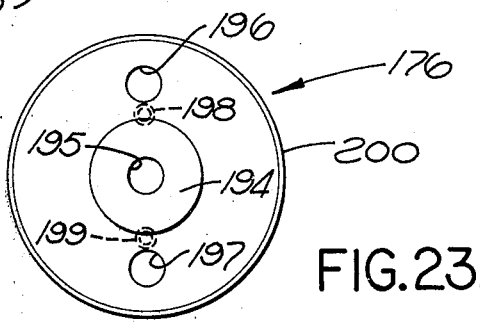
FIG.23.
FIG.24.
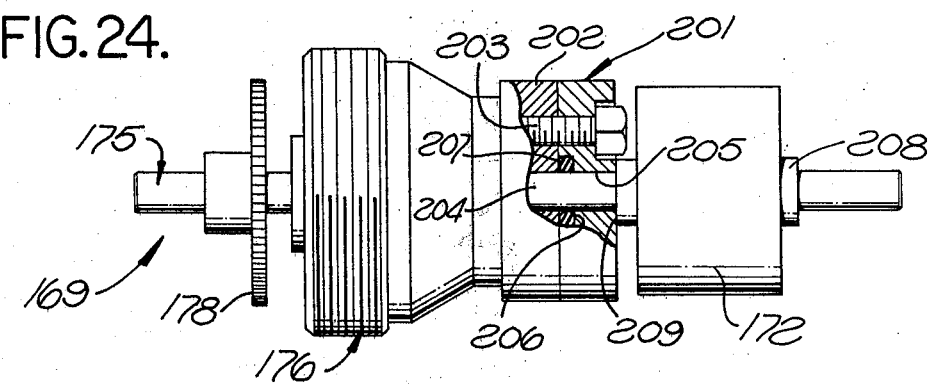
FIG.26.
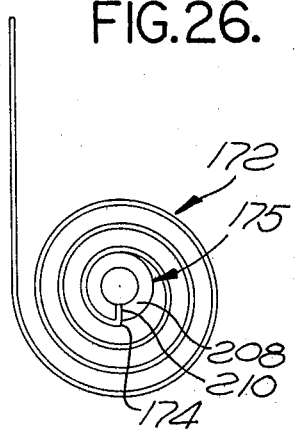
FIG.25.
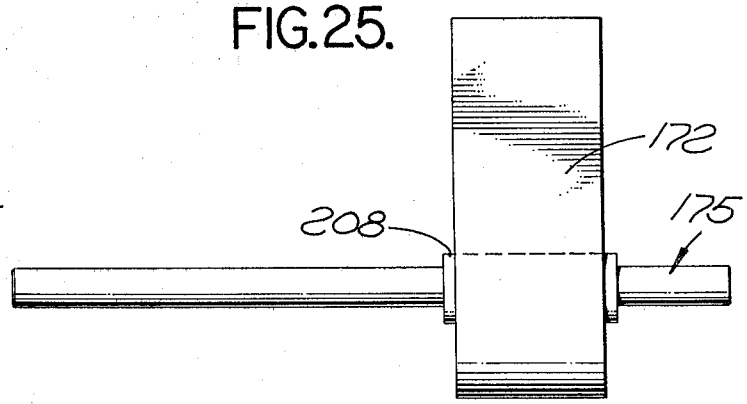

3,926,055

MECHANICAL SPAN AND ZERO ADJUSTMENT APPARATUS FOR PRESSURE TRANSDUCERS

BACKGROUND OF THE INVENTION

This invention relates to pressure sensors, and more particularly, to apparatus for producing an output which is a function of one or more pressures of one or more fluids.

In the prior art, it has been the practice to connect two chambers of a device known as a differential pressure unit (DPU) to a pipeline on opposite sides of an orifice therein. The DPU is a part of apparatus commonly called a transmitter. The output of the transmitter is then impressed upon a D.C. milliammeter, a process controller or otherwise. If desired, the milliammeter may be calibrated to read directly in pressure or differential pressure. Alternatively, the milliammeter may be calibrated to read directly in volume rate of flow. For example, the milliammeter may be calibrated to read in cubic feet per minute.

The most popular DPU in the past seems to have been of the double bellows type. For example, see U.S. Pat. Nos. 2,590,324; 2,917,081; 2,945,510 and 3,343,420. However, metal diaphragm DUP's are not unknown. See U.S. Pat. Nos. 3,492,872 and 3,620,135. Metal diaphragms are also known in non-analogous arts. See U.S. Pat. Nos. 1,921,312; 2,913,008 and 3,079,953.

Prior art DPU's have been inaccurate at low or high ranges because electronic span and zero adjustments have been made exclusively. These adjustments caused an amplification of mechanically induced errors.

SUMMARY OF THE INVENTION

In accordance with the apparatus of the present invention, the above-described and other disadvantages of the prior art are overcome by providing detachable range and/or zero adjustment springs which avoid the mechanical error amplification of the prior art by reducing or eliminating electronic span and zero adjustments.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a schematic diaphragm of a flowmeter analog source;

FIG. 2 is a top plan view of a diaphragm-type differential pressure unit (DPU);

FIG. 3 is a left end elevational view of the DPU shown in FIG. 2;

FIG. 4 is an end elevational view of a cover plate, two of which are employed in the DPU of FIGS. 2 and 3;

FIG. 5 is a top plan view of the cover plate shown in FIG. 4;

FIG. 6 is a longitudinal sectional view through the cover plate taken on the line 6—6 shown in FIG. 5;

FIG. 7 is a vertical sectional view of the DPU taken on the line 7—7 shown in FIG. 2;

FIG. 8 is a top plan view of a strain gage assembly employed in the DPU of FIGS. 2 and 3;

FIG. 9 is a vertical sectional view taken on the line 9—9 of the strain gage assembly shown in FIG. 8;

FIG. 10 is a perspective view of a metal stamping shown in FIGS. 8 and 9;

Figure 11:
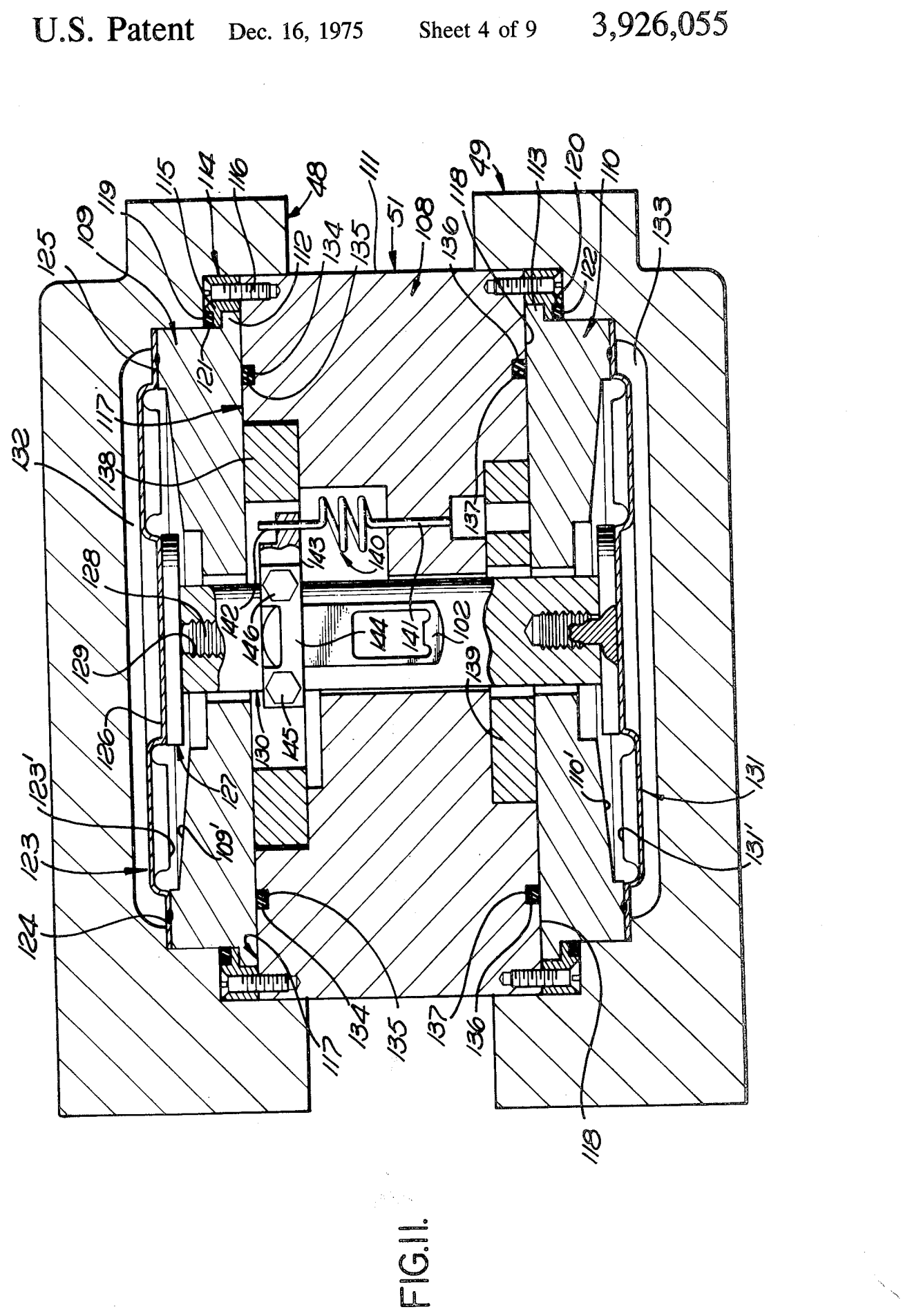

FIG. 11 is a vertical sectional view taken on the line 11—11 of the DPU shown in FIG. 2;

FIG. 12 is an end elevational view also shown in FIG. 11;

FIG. 13 is a top plan view of a diaphragm;

FIG. 14 is a greatly enlarged radical sectional view taken on the line 14—14 of the diaphragm shown in FIG. 13;

FIG. 15 is a vertical sectional view through the diaphragm shown in FIG. 13 and taken on the line 15—15 therein;

FIG. 16 is a graph of the linearity of non-linearity characteristics of the diaphragm shown in FIG. 13 and a conventional corrugated diaphragm;

FIG. 21 is a side elevational view of the central body looking from the left side thereof as viewed in FIG. 20;

FIG. 22 is a side elevational view of a zero spring assembly bearing;

FIG. 23 is an end elevational view of the bearing shown in FIG. 22;

FIG. 24 is a side elevational view of the zero spring assembly;

FIG. 25 is a side elevational view of the zero spring shaft and the spring carried thereby;

FIG. 26 is an end elevational view of the zero spring shaft and the spring carried thereby;

DESCRIPTION OF THE PREFERRED EMBODIMENT

Figure 18:
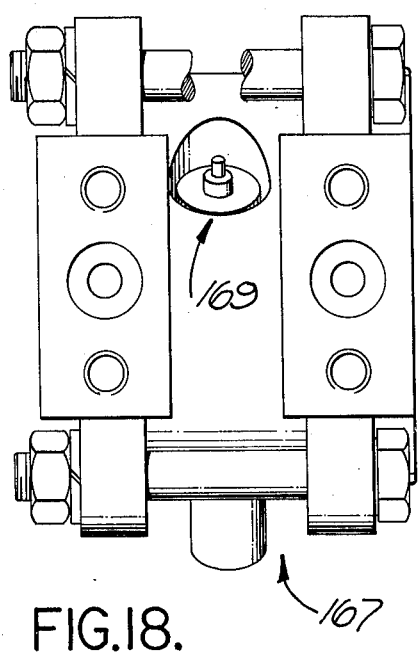
FIG. 18 is a left end elevational view of the DPU shown in FIG. 17.

In the drawings, in FIG. 1, a pipeline is illustrated at 40 having a disc 41 sealed therein, disc 41 having an orifice 42. Conduits 43 and 44 are connected from pipeline 40 on opposite sides of orifice 42 to a differential pressure unit 45. A transmitter circuit 46 is connected from the output of differential pressure unit 45 (DPU 45) to utilization means 47.

DPU 45 and circuit 46 together form what is commonly known as a transmitter. Utilization means 47 may be a milliammeter calibrated in differential pressure or in or in volume rate of flow. Alternatively, utilization means 47 may be a process controller or otherwise.

DPU 45 is illustrated in FIGS. 2–15, inclusive.

Transmitter circuit 46 may be any conventional transmitter circuit. Alternatively, transmitter circuit 46 may be identical to that disclosed in U.S. Pat. No. 3,518,886, the two strain gages disclosed hereinafter being substituted for those two strain gages disclosed in the said U.S. Pat. No. 3,518,886. Some of the structures disclosed in U.S. Pat. No. 3,518,886 are duplicated in FIGS. 8 and 9 hereof. Thus, where such structures are duplicated, those structures may be omitted from the portion of the structures which are disclosed in U.S. Pat. No. 3,518,886 when the structures not omitted are incorporated in the transmitter circuit 46.

It may be of assistance to note that throughout the FIGS. 2–15, inclusive, some of the several views are drawn to one scale and others to others different from the said one scale. Some views have been enlarged or greatly enlarged for clarity. Some background lines have also been omitted in connection with the diaphragms shown in FIGS. 11, 13 and 15, for clarity.

In FIG. 2, the DPU is indicated again at 45. DPU 45 has two cover plates. One cover plate is illustrated at 48 in FIG. 2. The other cover plate cannot be seen in FIG. 2 because it is exactly the same size as cover plate 48 and is aligned therewith. The other cover plate is illustrated at 49 in FIG. 3. Cover plate 49 will not be described in detail because it is identical to cover plate 48.

In FIG. 2, cover plate 48 has an upwardly extending boss 50. Both cover plates 48 and 49 are clamped over a body 51 shown in FIG. 3 by bolts 52, 53 and 54, shown in FIG. 2.

In FIG. 2, DPU 45 includes a hollow cylindrical tube 55 fixed relative to body 51. Tube 55 provides a housing for electrical leads which may be connected with the DPU 45. Tube 55 is illustrated in FIGS. 8 and 9 on a larger scale.

In FIG. 3, it will be noted that bolt 53 has a head 56 which abuts an ear 57 on cover plate 48. Bolt 53 has a shank 58 which is threaded at 59. A nut 60 is threaded to shank 58 and pulls cover plates 48 and 49 together firmly locking and clamping body 51 in a fixed position relative to the cover plates 48 and 49.

Cover plate 49 has an ear 61. A lock washer 62 is provided around bolt shank 58 between nut 60 and ear 61. Cover plate ears 57 and 61 have holes therethrough through which bolt shank 58 projects. All the bolts 52, 53 and 54 are, more or less, symmetrically positioned and have the same construction, are provided with nuts and lock washers, and help to hold the cover plates 48 and 49 in clamping engagement with body 51 in exactly the same way that bolt 53 does and as illustrated in FIG. 3 and described in connection with the showing in FIG. 3.

In FIG. 3, each of the cover plates 48 and 49 have end faces 63 and 64, respectively. As will be explained, cover plate 48 forms a first sealed chamber with body 51. Similarly, cover plate 49 forms a second sealed chamber with body 51 different from the said chamber. In FIGS. 4 and 5, cover plate 48, thus, has a port 65 therethrough into the said first sealed chamber. End face 63 of cover plate 48 in FIGS. 3 and 4 has a counterbore at 66. End face 63 of cover plate 48 also has tapped holes 67 and 68 therein. The construction of port 65, counterbore 66 and tapped holes 67 and 68 is merely to provide a fluid coupling to, for example, any conventional conduit and end fitting therefor such as may be employed with conduits 43 and 44. In one example, the conduit itself may have a grooved end surface and an O-ring in the groove to seal against the annular end surface 66' of counterbore 66 and the port 65. See FIG. 4. Cap screws then may be employed to hold the fitting by being threaded into tapped holes 67 and 68.

FIG. 4 is a view of cover plate 48 turned 90 degrees from the position shown in FIG. 3.

FIG. 5 is another top plan view of cover plate 48 illustrating the bolt holes 69, 70 and 71 through ears 72, 57 and 73 thereof, respectively.

In FIG. 5, cover plate 48 is cup shaped and has a cup-shaped chamber or recess 74 therein with which port 65 lies in communication. See FIG. 6.

In FIG. 7, a portion of a strain gage assembly 75 is illustrated fixed relative to body 51 by four hex head screws 76 that are slidable through corresponding holes in a flange 77 and are provided with washers 78. Flange 77 is illustrated both in FIGS. 8 and 9. However, the tapped holes in body 51 into which screws are threaded and the holes through flange 77 through which screws 76 are slidable are not illustrated.

As shown in all of the FIGS. 7, 8 and 9, flange 77 is provided with an annular boss 79. Tube 55 is brazed or otherwise fixed to flange boss 79 at 80 as shown in FIG. 9. Tube 55 is also illustrated in FIG. 7.

Four electrical conductors extend from the interior of body 51 to the exterior thereof, although only two such conductors, i.e. conductors 81 and 82, are illustrated in FIG. 9.

All four of the conductors are sealed through a glass disc 83. Glass disc 83 is, in turn, sealed within a metal ring 84. Metal ring 84 is, in turn, fixed in a bore 85 of a square tube 86 which is integral withh flange 77.

Flange 77 has an O-ring groove 87 therein in which an O-ring 88 is located. Thus, when screws 76 draw flange 77 tight to body 51, a fluid tight seal is provided around an opening 89 through the wall of body 51. The reason for this is that DPU 45, as well as some conventional DPU's, are filled with a liquid. In the instant case, the liquid fills the entire interior of body 51. At least as the space inside thererof is defined thereby and surrounding structures including, but not limited to, two diaphragms will be described.

In the construction illustrated in FIG. 9, a block or square rod section 90 is slidably positioned at the location illustrated in FIG. 9. Body 90 has a hole 91 extending part way thereinto. Tube 86 also has a hole 92 which is aligned with body hole 91. A locator pin 93 is then placed through both of the holes 91 and 92. Pin 93 may be press fit in either one or both of the tube 86 and the body 90.

A leaf spring cantilever beam 94 and a clamping plate 95 have holes which may be approximately aligned with a screw hole 96 through tube 86 and hole 92 into tube 86. Beam 94 and plate 95 may then be put in the position shown in FIGS. 8 and 9, and screw 97 slidably positioned therethrough and screwed into body 90 down tight against plate 95.

Beam 94 and some of the other structures illustrated in FIGS. 8 and 9, to the right of line 98 in FIG. 8, may be entirely conventional. For example, it is conventional to bond a strain gage at the same location on opposite sides of beam 94. Both such strain gages are employed. Only one such strain gage is illustrated at 99 in FIG. 8.

As is well known, each strain gage has two leads. Thus, one lead of each strain gage is connected to a corresponding respective conductor. The other leads of the strain gages are then connected to the respective conductors 81 and 82. An electrical lead 100 is connected from one end of strain gage 99 in FIG. 9. Another electrical lead 101 is connected from the other end of the strain gage 99. The connection of leads 100 and 101, and the two leads from the other strain gage to the conductors, such as conductors 81 and 82, have been omitted for clarity.

A metal stamping 102 illustrated in FIG. 8 has a tab 103 that is brazed or otherwise fixed over its entire area to an end portion 104 of beam 94. See also FIGS. 9 and 10.

In FIG. 9, beam 94 has a portion 105 and a portion 106. Portion 106 is the fixed end portion. Portion 104 is the free end portion. Portion 105 is tapered as shown in FIG. 8. Portion 105 is called the constant strain region and is conventional. Portion 106 is also conventional. Portion 104 is not conventional. Portions 104 and 105 are integral with one another. Similarly, portions 105 and 106 are integral with one another. A top plan view of portion 106 would be identical to a top plan view of plate 95 in a view similar to that shown in FIG. 8.

As shown in FIG. 10, stamping 102 is made by shearing an aperture 107 therein which is somewhat U-shaped leaving tab 103, which is struck out, in a plane approximately perpendicular to the plane of the remainder of the stamping 102.

An enlarged sectional view of the DPU 45 taken on the line 11—11 in FIG. 2 is shown in FIG. 11.

In FIG. 11, body 51 is illustrated including a block 108 having plates 109 and 110 fixed against opposite annular end faces 117 and 118, respectively, of the block 108, block 108 having a cylindrical external surface 111 which may or may not be occasionally interrupted by other structures. Plates 109 and 110 are generally cylindrical but have end flanges 112 and 113, respectively.

Plate 109 is held tight against block 108 by a ring 114 that has a flange 115 to overlie flange 112. Preferably, four screws 16 are slidable through ring 114 and threaded into block 108 to hold plate 109 tight to block 108.

Cover plates 48 and 49 are again shown in FIG. 11. Ring 114 has an O-ring groove 119 therein. An O-ring 121 is located in groove 119 of ring 114. O-ring 121 provides a fluid tight seal between cover plate 48 and plate 109.

All the structures shown above the block end face 117, as viewed in FIG. 11, may be identical to all the structures shown below the block and face 118. For this reason, only a portion of the structures shown below block end face 118 will be described in further detail.

In FIG. 11, a generally circular metal diaphragm 123 is illustrated having an annular portion 124 which is seam welded to plate 109 on an annular surface 125 thereof. The seam weld provides a fluid tight seal around the complete circumference of plate 109 and also fixes the annular portion 124 of diaphragm 123 in position relative to plate 109.

In FIG. 11, diaphragm 123 has a circular center portion 126 to which a disc 127 is everywhere bonded. Disc 127 may have a stud 128 integral therewith or otherwise fixed thereto that is threaded into a tapped hole 129 in one end of a center post 130.

Plate 110 similarly has a metal diaphragm 131 fixed thereto. In accordance with the foregoing, both of the diaphragms 123 and 131 are fixed relative to the ends of post 130.

Post 130 preferably is slidable through certain bores in block 108. Preferably the diameters of the bores are oversize so that the post 130 does not touch any of them.

Note will be taken, in FIG. 11, that cover plate 48 and diaphragm 123 are spaced apart and defined a chamber 132 therebetween, as mentioned previously. Similarly, cover plate 49 and diaphragm 131 define a chamber 133. Chambers 132 and 133 are fluid tight. For example, chamber 132 is fluid tight because of the use of O-ring 121, and also because the seam weld provides a seal between the annular portion 124 of diaphragm 123 and the annular surface 125 of plate 109.

The chambers 132 and 133 are fluid tight except, of course, for port 65 in cover plate 48 shown in FIG. 6 and a port identical to port 65 in cover plate 49.

Block end face 117 has an O-ring groove 134 therein in which an O-ring 135 is positioned to provide a fluid tight seal between block 108 and plate 109. Similarly, an O-ring groove 135 is provided in end face 118, and an O-ring 137 is positioned therein to provide a fluid tight seal between block 108 and plate 110.

Annular filler blocks 138 and 139 are provided to minimize the amount of fluid needed to fill all communicating chambers between the diaphragms 123 and 131, inside thereof. It is conventional, for example, to fill a bellowtype differential pressure unit with a silicone oil or other liquid aas a partial overpressure protection.

A helically coiled spring 140 is provided having one end 141 fixed to block 108 and another end 142 fixed to a flange 143 which may be fixed to or integral with post 130.

Spring 140 may be omitted in some cases. When spring 140 is omitted, the DPU 45 becomes bi-directional. That is, the pressure in chamber 132 may be higher than that in chamber 133 or the pressure in chamber 133 may be higher than that in chamber 132. As shown, chamber 133 is the high pressure chamber. This is true because the force applied to flange 143 by spring 140 is in opposition to the deflection taken by diaphragms 131 on account of an increase in pressure in chamber 133.

In FIG. 11, stamping 102 is clamped to flange 143 in a fixed position relative to post 130 by a clamping plate 144 that holds stamping 102 tight against flange 143, plate 144 being held in a clamping position on stamping 102 by hex head screws 145 and 146 threaded into flange 143. Screws 145 and 146 thus hold plate 144 tightly against stamping 102, and, in turn, stamping 102 tightly against flange 143.

Portions 123' and 131' of diaphragms 123 and 131 nest in plates 109 and 110 during respective overpressures. When so nesting, diaphragm portions 123 and 131' seat upon respective frusto-conical surfaces 109' and 110' of plates 109 and 110, respectively.

As shown in FIGS. 11 and 12, plates 44 is U-shaped.

Flange 143, as shown in FIG. 12, has a step portion 147. Flange 143 also has bleed holes 148 and 149. Bleed holes 148 and 149 extend completely through flange 143 and allow fluid on opposite sides of the flange 143 to flow therethrough more easily to increase the speed of response of the DPU 45, if desired. Alternatively, or in addition, bleed holes 148 and 149 may provide moderate or large restrictions to flow and thereby operate to damp the output of DPU 45.

As stated previously, diaphragm 131 may be identical to diaphragm 123, if desired. Diaphragm 123 will, thus, be the only diaphragm which will be described in further detail.

FIG. 13 is a top plan view of the diaphragm 123. If desired, diaphragm 123 may have a substantially uniform thickness throughout its complete extent. Diaphragm 123 is preferably made by forming a circular, thin, flat blank of uniform thickness equal to about 5 mils of 17—17 or 17—4 precipitation hardenable stainless steel. However, other materials are possible--even plastic. However, the said precipitation hardenable stainless steel is preferable. Other materiaals which may be used are Martensitic stainless steel, 400 stainless steel, the coblat alloys such as the Hamilton Watch Company's cobalt alloy sold under the trade name "Elgilloy." Alternatively, 316 stainless steel may be employed.

Diaphragms 123 and 131 may be made in an identical manner, if desired.

Diaphragm 123 is, thus, formed between dies in a press to the size and shape illustrated, although not necessarily to scale, in FIGS. 13, 14 and 15.

In FIG. 13, diaphragm 123 is shown with the annular portion 124 thereof. Annular portion 124 may have substantially flat parallel surfaces in respective parallel planes except for a cylindrical surface 150 over the thickness thereof. Diaphragm 123 then has portions 151 and 152 which have opposite surfaces, each of which would generally be defined as one-half of a torus cut by a plane normal to the axis thereof with radii, R and r, defining different torus locations of certain surfaces of the portions 151 and 152.

The axis of the torus which would define one surface of portion 152 would be generally identical to the axis of the torus which would define one surface of portion 151. This axis would lie perpendicular to the plane of the drawing of FIG. 13 through the point 153. The portions 151 and 152 are connected by spokes 155, which with portions 151 and 152, form an embossed wheel 154. Each pair of immediately adjacent spokes 155 is connected by arcuately shaped webs 156. Each web also connects portions 151 and 152.

Each web 156, when diaphragm 123 is unstressed, has an upper surface that lies generally in the same plane as the upper surface of annular portion 124 and the upper surface of portion 126. The lower surfaces of portions 156, 124 and 126 similarly lie in the same plane.

Spokes 155 have generally a half cylinder shape. They may, for example, have a diameter, F, equal to about 130 mils, as shown in FIG. 15. The dimension, E, shown in FIG. 13 may also be 130 mils, if desired. The same is true of the dimension, D.

In FIG. 13, the dimention, G, may be 115 mils, if desired.

A view of the diaphragm 123 on the reverse side thereof might be substantially identical to that shown in FIG. 13. However, in this case, the embossments would become channels. Note that the diaphragm 123 has the spokes 155 and the portions 151 and 152 which are embossments on one side, i.e. on the side shown in FIG. 13. Thus, on the reverse side, the embossments become channels because diaphragm 123 has a substantially uniform thickness. In such a case, each channel corresponding to one spoke 155 would then lie in communication with channels in corresponding portions 151 and 152 as indicated by arrows 157 in FIG. 13.

If desired, the radius, R, may equal 2½ inches. The radius, r, may be, if desired, ½ inch.

In FIG. 14, preferably portion 151 has a curvature, as shown, which is as nearly accurate to a semi-circle as possible. The same would be true of a corresponding radially extending section through portion 152 and a section through a spoke 155 normal thereto.

As stated previously, background lines have been omitted in connection with the diaphragms 123 and 131 in FIGS. 11, 13 and 15 in several places for clarity. For example, background lines have been omitted at 158 in four locations in FIG. 15.

OPERATION

If fluid under pressure is admitted to chamber 133, which has a pressure in excess of the pressure of fluid in chamber 132, diaphragms 123 and 131 will deflect upwardly, as viewed in FIG. 11, moving post 130 in the same direction. Stamping 102 is fixed to post 130 and, therefore, deflects beam 94 shown in FIG. 8 in a downward direction in FIG. 9 because of the veiw taken. Strain will then be induced in both of the strain gages fixed to beam 94, and transmitter circuit 46 connected from the strain gages may cause utilization means 47 to indicate volume rate of flow, for example. As stated previously, utilization means 47, in this case, may be a milliammeter calibrated in volume rate of flow or gallons per minute. The output of transmitter circuit 46 in FIG. 1 may then be a D.C. current directly proportional to the difference between the pressures of the fluids in chambers 133 and 132.

One outstanding advantage of the DPU 45 is its linearity. This linearity is plotted at 159 in FIG. 16 as a function of deflection. The linearity of a flat, circular diaphragm is plotted at 160 in FIG. 16 from data published by the U.S. National Bureau of Standards. In FIG. 16, note will be taken that curve 159 has a portion 161 over a deflection range which has a substantially better linearity than the curve 160. It is, in fact, generally in this area of curve 159 which the diaphragms 123 and 131 are operated.

Actually, it is common to call the curves 159 and 160 "linearity" curves. The fact of the matter is that the function graphed is a function of non-linearity rather than linearity. A point such as the X marked point 162 is taken from performance data. A pressure versus deflection curve is plotted first. The non-linearity, for example, at point 162 is then calculated by drawing a straight line from the origin (0, 0) to a point on the pressure versus deflection curve. The maximum error between zero and, for example, point 162 is measured. The percent linearity (actually non-linearity) for point 162 is then calculated by dividing the maximum error by the ordinate of point 162 and multiplying times 100.

It is a substantial advantage that the embossed wheel pattern 154 in FIG. 13 is employed and, yet, the diaphragms 123 and 131 are made stiff and rigid to provide good linearity with a small deflection over a large pressure range.

The phrase "means to supply fluid under pressure" is hereby defined for use herein and in the claims to means any one or more or all of the following, with or without other structures: a source of fluid under pressure, a conduit, a port or a similar admitting orifice.

The word "output," as used herein and in the claims, is hereby defined to include an output which is either mechanical or electrical or otherwise.

The word "integral" is hereby defined for use herein and in the claims to exclude a bolted, screwed, bonded, sealed or other connection of parts fastened together in any other similar ways, but to include only a molded or formed single, unitary piece of material that is found that way in its natural state or has been produced by a chemical reaction or smelted or the like such that it is substantially isotropic throughout a connection of two parts.

The phrase "utilization means" is hereby defined for use herein and in the claims to include, but not be limited to, an ammeter or milliammeter calibrated in volume rate of flow or in differential pressure, a process controller or otherwise.

In FIG. 16, curve 160 has points 164, 165 and 166. The data for all the points 161 to 166, inclusive, are as follows. The diaphragms corresponding to the curves 159 and 160 in FIG. 16 each had a radius, R, equal to 1.75 inches. The deflections for points 164, 165 and 166 were respectively equal to ½, 1 and 2 percent of 2R. Points 164, 165 and 166 had percent non-linearities of .8, .7 and .4, respectively. For the same ½, 1 and 2 percent of 2R deflections, points 163, 162 and 161 had percent non-linearities of 0.1, 0.6 and 2.6, respectively.

After diaphragm 123 in FIG. 13 is formed as shown therein and as shown in FIGS. 14 and 15, diaphragm 123 is precipitation hardened. This may be done by any conventional method. For example, diaphragm 123 may be heated in an evacuated chamber to 1,550°F. and the 1,550°F. held for 90 minutes. The diaphragm 123 is then cooled to room temperature by turning off the heat to the vacuum chamber and by passing nitrogen or another gas or gas mixture providing a neutral atmosphere through the vacuum chamber at about one atmosphere. Preferably, the diaphragm 123 is cooled to room temperature within one hour immediately succeeding the 90 minute period described above in this paragraph. Diaphragm 123 is then refrigerated to 0° F. for 30 minutes. Diaphragm 123 is then heated in the vacuum chamber again to 1,050° F. and this 1,050° F. temperature held for 90 minutes. The diaphragm 123 is then cooled in the same manner as before.

In an alternative embodiment of the invention, diaphragms may be coated with layers of plastic 2 or 3 mils thick for corrosion resistance or otherwise.

In the prior art, two openings have sometimes been employed into the interior of a DPU. These openings are employed so that air may be evacuated through one opening, and the fluid to fill the interior of the DPU may be introduced through the other opening. Such openings are not disclosed herein but any conventional ports may be provided for that purpose.

In FIG. 13, the curvature of the portions 151 and 152, and the curvature of the spokes 155 are specially adapted to make the diaphragm 123 strong. It will withstand exceedingly high loads.

Any conventional transducer may be substituted for the portion of a transducer shown in FIG. 8. Alternatively, the strain gages in FIG. 8 may be bonded to beam 94 by the use of glass, an epoxy or otherwise. As alternatives for the transducer of FIG. 8, a torque tube output or an electromechanical pick-up or other devices are also possible.

Diaphragms 123 and 131 may alternatively be made of 316 stainless steel.

Notwithstanding the foregoing, it will be appreciated that the use of two diaphragms is not always required. The present invention may be practiced by the use of one diaphragm. For prior art on single bellows and differential pressure units, see, for example, U.S. Pat. No. 2,752,949

As stated previously, the large bonding areas and flexibility of the tab 103 of stamping 102 and its bond over its entire area to the portion 104 of beam 94 in FIG. 8 provide for extremely good accuracy.

The phrase "full scale deflection" is hereby defined to include deflection in one direction only either away from or toward an unstressed position.

Figure 17:
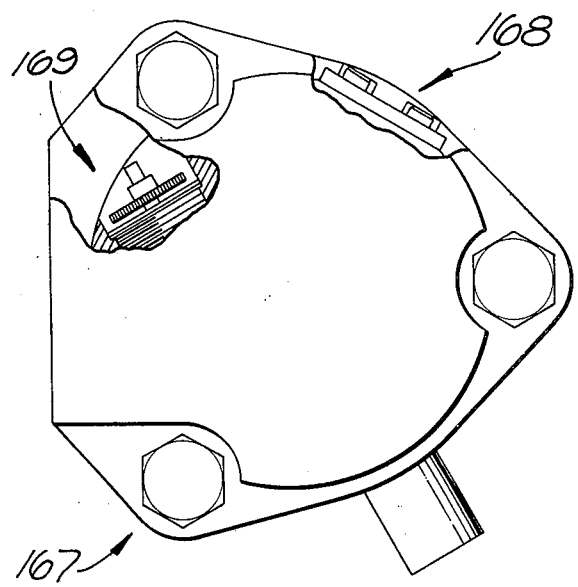
FIG. 17 is a broken away top plan view of a DPU constructed in accordance with the present invention.

In FIG. 17, a DPU is indicated at 167. DPU 167 may be identical to DPU 45 except as indicated in the following. DPU 167 has a range spring assembly 168 and a zero spring assembly 169. Both of these are shown in FIG. 17. Only zero spring assembly 169 is shown in FIG. 18.

Figure 20:
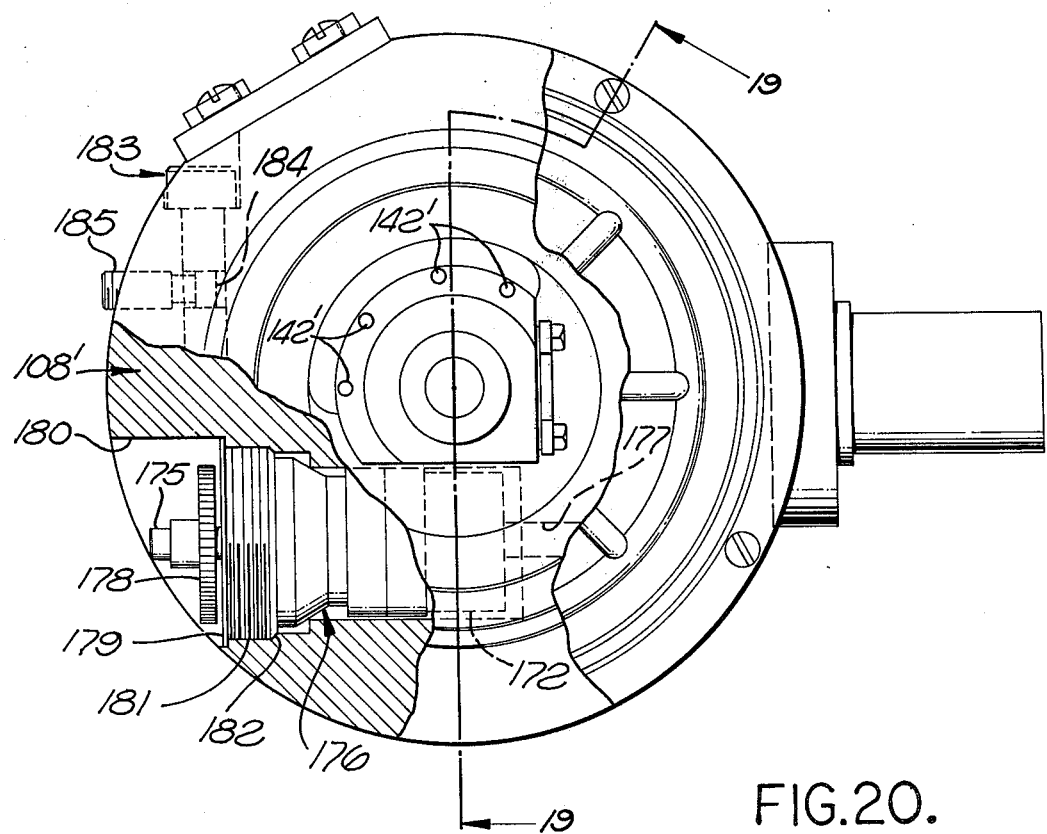
FIG. 20 is a broken away bottom plan view of a central body of the DPU shown in FIGS. 17, 18 and 19.
Figure 19:
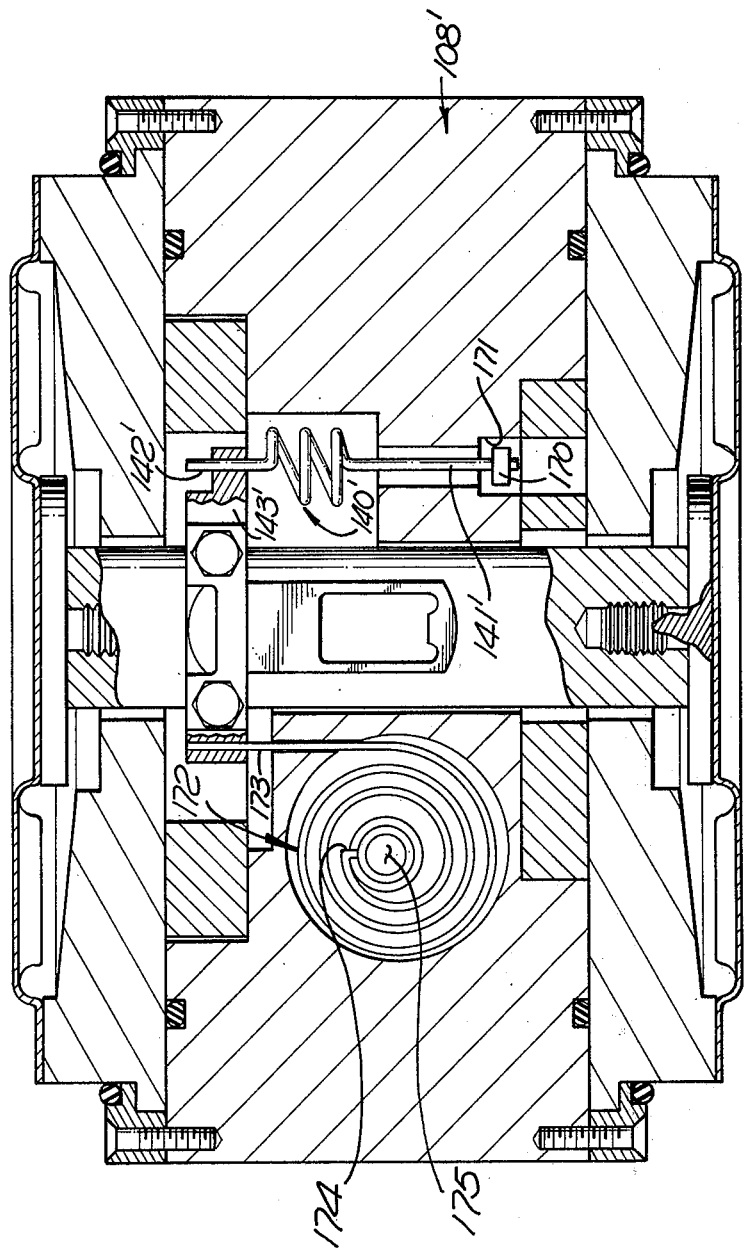
FIG. 19 is a vertical sectional view taken on the line 19—19 of the DPU shown in FIG. 20.

Note will be taken that many of the structures shown in FIG. 19 are identical to those shown in FIG. 11. For this reason, only the structures in FIG. 19 which are different from the corresponding structures shown in FIG. 11 will be described. In FIG. 19, a range spring 140' has one end 142' fixed to flange 143'. Flange 143' may be identical to flange 143, except that four range springs 140' are connected thereto. Four holes are provided through flange 143', as shown in FIG. 20.

Notwithstanding the foregoing, as indicated in FIG. 19, spring 140' has end portions 141' and 142' that can remain stationary with respect to each other so that the spring 140' is not placed in tension when the diaphragms take a deflection. Spring end 141' has an enlargement 170 fixed thereto which may be clamped against a bore 171 in block 108'.

Also in FIG. 19, a spiral zero spring 172 has an outer end 173 fixed to flange 143', and an inner end 174 fixed to a shaft 175.

In FIG. 20, shaft 175 is again shown rotatable in a zero spring assembly bearing 176 and a bore 177 in the block 108'. Bore 177 may be sufficiently short so as to limit axial movement of shaft 175 to the right, as viewed in FIG. 20, if desired.

In FIG. 20, a worm gear 178 is fixed to shaft 175. A cover plate 179 is press fit into a bore 180 of block 108'. Bearing 176 is threaded into block 108' at 181. Block 108' has a beveled surface 182 against which bearing 176 provides a metal-to-metal seal.

A worm 183 having the head of a hex head socket screw has a reduced diameter at 184 in which rides the end of a set screw 185. Set screw 185 likewise may have a head identical to a hex head socket screw. Axial movement of worm 183 is, therefore, limited by the position of set screw 185 close to the smaller diameter portion 184 of worm 183. However, when set screw 185 is loosened somewhat, even though worm 183 cannot travel a distance axially, it can at least rotate. Rotation of worm 183 increases rotation of worm gear 178. This sets the tension of spiral spring 172. When the tension is proper, set screw 185 is turned into block 108'. It then fixes worm 183 to block 108' so that it cannot rotate or move axially relative thereto while in the desired position.

In FIG. 21, the threaded portion of the worm 183 is illustrated at 186 in mesh with worm gear 178.

In FIG. 21, a cover plate 187 is shown for the range spring assembly 168. Cover plate 187 is fixed to block 108' by cap screws 188 and 189. Each end 141' of each spring 140' may be fixed relative to block 108' or not fixed thereto by rotating one of four screws 190, 191, 192 and 193 in one of its two opposite directions, each of the screws 190 to 193 being provided with a screwdriver slot for that purpose.

Bearing 176 is shown in FIG. 22 having a boss 194. Bearing 176 also has a bore 195 extending completely therethrough through which and in which shaft 175 is both axially slidable and rotatable, respectively. Bearing 176 also has spanner wrench holes 196 and 197, and tapped holes 198 and 199 into the front and rear faces thereof, respectively. Bearing 176 has a portion 200 which is externally threaded. All the parts of the bearing 176 described in connection with FIG. 22 can also be seen in FIG. 23.

Another view of the zero spring assembly 169 is shown in FIG. 24. A disc 201 is fixed to the right end 202 of bearing 176 by preferably three or four or more screws 203, only one of which is shown in FIG. 24. Shaft 175 has a portion 204 integral therewith which is rotatable in bearing 176 and in disc 201. For this purpose, disc 201 has a bore 205 through which shaft 175 extends. Disc 201 also has a counterbore at 206, the end surface thereof and this counterbore 206 forming with bearing 176 an O-ring groove in which an O-ring 207 is located around shaft portion 204. Shaft 175 has a portion 208 integral therewith which has a diameter somewhat larger than its diameter throughout the remainder of its length. Note will be taken that shaft 175 cannot slide to the left, as viewed in FIG. 24, beyond the position shown because shaft portion 208 abuts disc 201 at the location 209 shown in FIG. 24. This is true because disc 201 remains stationary, it being fixed to bearing 176 by screws 203, and bearing 176 being screwed in tight to block 108', as described previously.

Further detail concerning spiral spring 172 and shaft 175 is shown in FIGS. 25 and 26. In FIG. 26, the inner end 174 of spiral spring 172 may be fixed in a slot 210 in shaft portion 208, if desired, and as shown. Further, if desired, spiral spring 172 may be bonded to shaft portion 208 for one-half turn around shaft portion 208 from the inner end 174 of spring 172, as shown in FIG. 26. The range spring assembly is again shown in FIGS. 27 and 28.

Figures 27, 28:
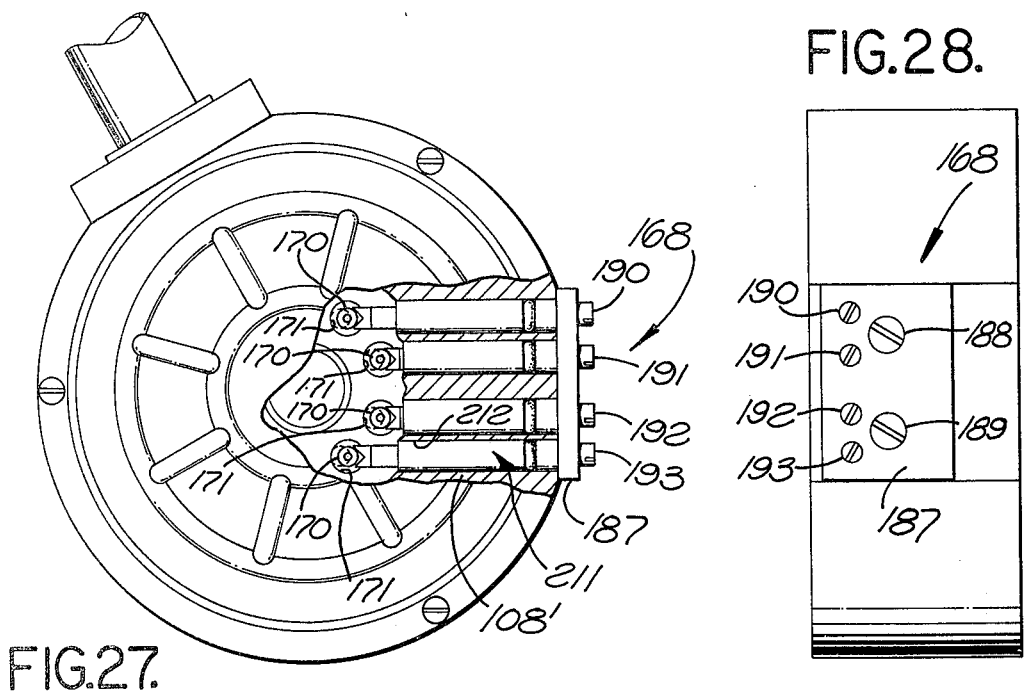
FIG. 27 is a side elevational view, partly broken away, of the central body of the DPU of FIGS. 17–19, inclusive.
FIG. 28 is a side elevational view of the structure shown in FIG. 27.

In FIG. 27, range spring adjustments are shown for four springs. However, all of these adjustments are essentially identical. Only one such adjustment will, therefore, be described.

Figure 29:
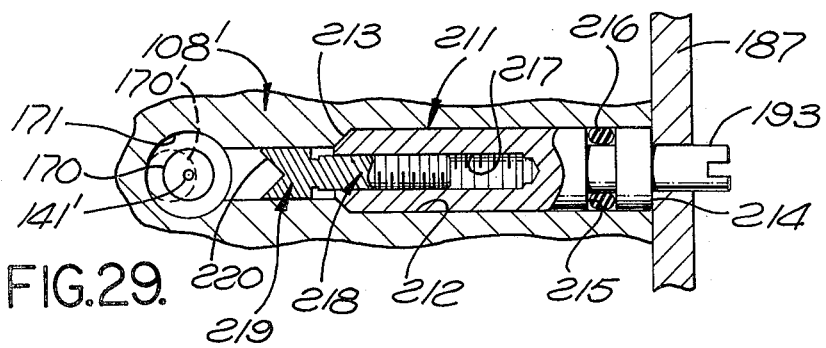
FIG. 29 is an enlarged view of means to clamp one end of a range spring in place.

In FIG. 27, a member 211 is rotatable in bore 212 of block 108'. Screw 193 is integral with member 211 shown in FIG. 29. Screw 193 is not exactly a screw because member 211 stays in a substantially fixed axial position. Member 211 cannot move axially to the left, as viewed in FIG. 9, because it abuts a shoulder 213 of block 108' in bore 212. Member 211 has a shoulder 214 which abuts cover plate 187 that is fixed relative to block 108' by screws 188 and 189 shown in FIGS. 21 and 28. Member 211 has an O-ring groove 215 and an O-ring 216 therein which seals between member 211 and bore 212 as shown in FIG. 29. Member 211 has a threaded bore 217 into which a member 218 is threaded. Member 218 has an end portion 219 that is notched at 220 to seize the said enlargement 170 fixed to range spring end 141' controlled by member 211 and to clamp it against the bore 171 of block 108' in the position shown at 170' in FIG. 29.

Figures 30, 31:
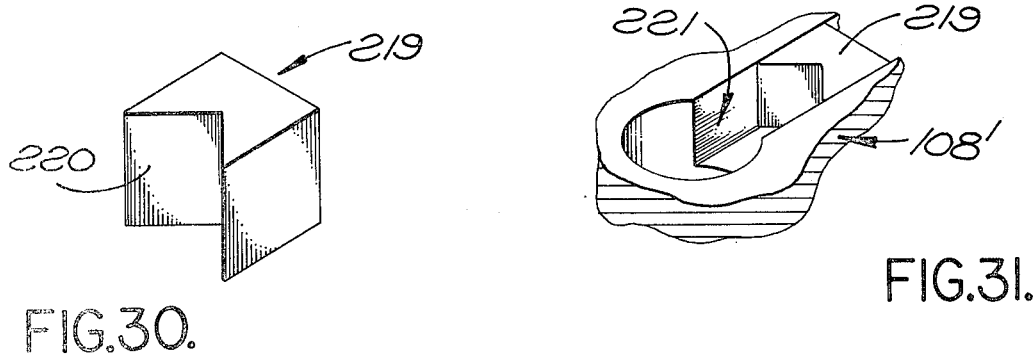
FIG. 30 is an enlarged perspective view of one of the structures shown in FIG. 29.
FIG. 31 is a perspective view of a portion of the DPU body and the device of FIG. 30 slidably mounted in a groove therein.

Member portion 219 is again shown in FIGS. 30 and 31. Portion 219 is slidable in a groove 221 in block 108' as shown in FIG. 31. Although it is not necessary, member portion 219 may be a perfect cube except for the notch 220 therein. Further, if desired, the groove 221 in FIG. 31 may have a depth and width equal to the length of one side of the said cube.

Any conventional electronic zero and/or span adjustments may or may not be used in addition to the range spring and zero spring adjustments disclosed herein, as desired. Conventional electronic zero and span adjustments are disclosed in U.S. Pat. No. 3,578,886 which may be employed with the present invention. For example, it is typical in this patent that a single pole, multiple throw range switch and/or potentiometer are provided simply to reduce or increase the gain of a conventional or operational or other amplifer. It is also known that this can be done with an analog adder using a summing amplifier with a feedback resistor adjustable continuously or in steps. The same is true of an input to the adder, which may be provided by a potentiometer or in steps from a plurality of resistors connected from a single pole, multiple throw switch. For example, see U.S. Pat. No. 3,722,264.

The phrase "order of magnitude less than" is hereby defined for use herein and in the claims to mean "not more than about one-tenth of."

From the foregoing, it will be appreciated that one, two, three or four or more of the range springs 140' may be employed with or without zero spring 172, and vice versa. Some of this statement may be described another way. That is, there may be first, second, third ... $n^{th}$ springs, if desired, where $n$ is any positive integer. This last sentence is hereby a definition for use herein and in the claims to means that any number of range springs including one or more thereof may be employed.

The range springs 140' have respective force constants of 125, 250, 500 and 1,000 in units of pounds per inch. These numbers may be considered accurate, if desired, within ±5 percent. The force constants of the range springs 140' may also be described another way. That is, first, second, third ... $n^{th}$ springs can be described having force constants $2^1k$, $2^2k$, $2^3k$ ... $2^nk$, where $k$ is a constant. For the first spring 140' to have a force constant of 125 pounds per inch, the $k$ in this case is, therefore, 62.5 pounds per inch.

This application contains some subject matter common to that disclosed in applications Ser. Nos. 402,361, 402,036 and 402,035, respectively, filed Oct. 1, 1973, Oct. 1, 1973, and Oct. 1, 1973, respectively, for PRESSURE SENSOR APPARATUS AND TRANSDUCER THEREFOR, COLD WORKING PROCESS and FLUID PRESSURE SENSING SYSTEM AND DIFFERENTIAL PRESSURE UNIT THEREFOR, by L. T. Garnett-L. D. Lyon, R. P. Granada and L. D. Lyon, respectively. All of the last three mentioned applications are copending with this application. Said application Ser. No. 402,361 is now U.S. Pat. No. 3,875,802.

In FIG. 16, the diaphragm of curve 160 had an equally bad linearity when deflected in the opposite direction and an undesirable abrupt change in rate at a neutral (e.g. zero deflection) position. The diaphragm of the curve 150 had an equally good linearity when deflected in the opposite direction (one-half of non-linearity indicated in FIG. 16) and no undesirable abrupt change in rate at a neutral position. In these two instances, "rate" means the slope of the curves 159 and 160 on opposite sides of the neutral position at small positive and negative deflections, e.g. at deflections of ±0.008 inch, more or less.

The tapped hole 68 in FIG. 5 has been omitted in FIG. 11 for clarity.

What is claimed is:

1. Apparatus for producing an output in accordance with the pressure of a fluid, said apparatus comprising: a body having a portion with a hole extending all the way therethrough, said body portion having two openings into said hole at the respective opposite ends thereof; two diaphragms each having an annular part sealed and fixed relative to said body portion around a respective one of said two openings sealing both of said openings shut, said diaphragms being fixed relative to said body portion in a manner such that said annular parts lie in respective first and second parallel planes, a first side of each diaphragm facing the corresponding opening adjacent thereto, each diaphragm having a second side opposite said first side thereof; input means to supply fluid under pressure to the second side of one diaphragm, each of said diaphragms having a movable part to take a deflection in accordance with the magnitude of said fluid pressure, said movable part of said one diaphragm having a portion; connection means movable independent of said body, but holding said diaphragm portions in fixed positions relative to each other; a spring having first and second ends, said first end being fixed relative to one of said portions to bias the said one diaphragm in a direction normal to the plane thereof; span adjustment means selectively movable from a first position to a second, and vice versa, to fix said spring second end relative to and connect it to the other of said portions, and to disconnect said spring second end from said other portion, respectively, said spring being constructed and mounted to apply a force in a direction toward the first side of said one diaphragm when said span adjustment means is in said first position thereof; and output means connected from said one diaphragm portion to said body for producing an output which is a predetermined function of said fluid pressure.

2. The invention as defined in claim 1, including utilization means connected from said output means.

3. The invention as defined in claim 2, wherein said utilization means includes a milliammeter calibrated in pounds per square inch.

4. Apparatus for producing an output in accordance with the pressure of a fluid, said apparatus comprising: a body having a portion with a hole extending all the way therethrough, said body portion having two openings into said hole at the respective opposite ends thereof; two diaphragms each having an annular part sealed and fixed relative to said body portion around a respective one of said two openings sealing both of said openings shut, said diaphragms being fixed relative to said body portion in a manner such that said annular parts lie in respective first and second parallel planes, a first side of each diaphragm facing the corresponding opening adjacent thereto, each diaphragm having a second side opposite said first side thereof; input means to supply fluid under pressure to the second side of one diaphragm, each of said diaphragms having a movable part to take a deflection in accordance with the magnitude of said fluid pressure, said movable part of said one diaphragm having a portion; connection means movable independent of said body, but holding said diaphragm portions in fixed positions relative to each other; input means to supply fluid under pressure at least to the second side of said one diaphragm to cause deflection and movement of one portion thereof as a function of said pressure; first, second third ... $n^{th}$ springs, each of said springs having first and second ends, one of the ends of each of said springs being fixed relative to one of said portions; first, second, third ... $n^{th}$ span adjustment means corresponding to and for said first, second, third ... $n^{th}$ springs, respectively, each said span adjustment means being movable from a first position to a second, and vice versa, to fix the said one end of a corresponding spring relative to and to connect it to the other of said portions, and to disconnect said one end of said corresponding spring from said other portion, respectively, said springs all being constructed and mounted to apply at least respective components of forces to said sensor in the same direction and in a direction toward the first side of said one diaphragm when a corresponding span adjustment means is in said first position thereof; and output means connected from said one diaphragm portion to said body for producing an output which is a predetermined function of said fluid pressure.

5. The invention as defined in claim 4, including utilization means connected from said output means.

6. The invention as defined in claim 5, wherein said utilization means includes a milliammeter calibrated in pounds per square inch.

7. The invention as defined in claim 6, wherein said first, second, third ... $n^{th}$ springs have force constants $2^1k$, $2^2k$, $2^3k$ ... $2^nk$, respectively, when $n$ is the number of said springs, and $k$ is a constant.

8. The invention as defined in claim 7, wherein each of said springs is a helically coiled tension spring, all of said springs having parallel helical axes lying approximately normal to said first and second planes in positions therebetween, said one portion being said one diaphragm portion, said other portion being said body portion, each adjustment means including means to clamp the second end of the corresponding spring against said body portion.

9. The invention as defined in claim 4, wherein said first, second, third ... $n^{th}$ springs have force constants $2^1k$, $2^2k$, $2^3k$ ... $2^nk$, respectively, where $n$ is the number of said springs, and k is a constant.

10. Apparatus for producing an output in accordance with the pressure of a fluid, said apparatus comprising: a body having a portion with an opening thereinto; a sensor having first and second sides and an annular part of said first side sealed to and fixed relative to said body portion around said opening; input means to supply fluid under pressure at least to a first predetermined one of said first and second sides of said sensor to cause deflection and movement of one portion thereof in accordance with said pressure; a spiral spring having inner and outer ends, said spring outer end being fixed relative to one of said sensor portions; a shaft rotatably mounted in a fixed axial position on the other of said portions, said spiral being coiled around said shaft, said spring inner end being fixed relative to said shaft; and releasable means to fix said shaft in a selected position of its rotation to the said other portion, said spiral spring being constructed and mounted to apply a force to said sensor in a direction toward a second predetermined one of said first and second sides thereof when said shaft is fixed as aforesaid, said first and second predetermined sides not necessarily being the same side, rotation of said shaft causing the said force to vary when said shaft is not fixed; and output means connected from said sensor portion to said body for producing an output which is a predetermined function of said fluid pressure.

11. The invention as defined in claim 10, including utilization means connected to said output means.

12. The invention as defined in claim 11, wherein said utilization means includes a milliammeter calibrated in pounds per square inch.

13. The invention as defined in claim 12, wherein said first predetermined side is always a side opposite said second predetermined side.

14. The invention as defined in claim 10, wherein said first predetermined side is always a side opposite said second predetermined side.

15. The invention as defined in claim 11, wherein said first predetermined side is always a side opposite said second predetermined side.

16. Apparatus for producing an output in accordance with the pressure of a fluid, said apparatus comprising: a body having a portion with a hole extending all the way therethrough, said body portion having two openings into said hole at the respective opposite ends thereof; two diaphragms each having an annular part sealed and fixed relative to said body portion around a respective one of said two openings sealing both of said openings shut, said diaphragms being fixed relative to said body portion in a manner such that said annular parts lie in respective first and second parallel planes, a first side of said diaphragm facing the corresponding opening adjacent thereto, each diaphragm having a second side opposite said first side thereof; input means to supply fluid under pressure to the second side of one diaphragm, each of said diaphragms having a movable part to take a deflection in accordance with the magnitude of said fluid pressure, said movable part of said one diaphragm having a portion; connection means to hold said diaphragm parts in fixed positions relative to each other; a spiral spring having inner and outer ends, said spring outer end being fixed relative to one of said portions; a shaft rotatably mounted in a fixed axial position on the other of said diaphragm portions, said spiral spring being coiled around said shaft, said spring inner end being fixed relative to said shaft; and releasable means to fix said shaft in a selected position of its rotation to the said other portion, said spiral spring being constructed and mounted to apply a force to said one diaphragm in a direction toward said first side thereof, rotation of said shaft causing the said force to vary when said shaft is not fixed; and output means connected from said one diaphragm portion to said body for producing an output which is a predetermined function of said fluid pressure.

17. The invention as defined in claim 16 including utilization means connected to said output means.

18. The invention as defined in claim 17, wherein said utilization means includes a milliammeter calibrated in pounds per square inch.

19. Apparatus for producing an output in accordance with the pressure of a fluid, said apparatus comprising: a body having a portion with a hole extending all the way therethrough, said body portion having two openings into said hole at the respective opposite ends thereof; two diaphragms each having an annular part sealed and fixed relative to said body portion around a respective one of said two openings sealing both of said openings shut, said diaphragms being fixed relative to said body portion in a manner such that said annular parts lie in respective first and second parallel planes, a first side of each diaphragm facing the corresponding opening adjacent thereto, each diaphragm having a second side opposite said first side thereof; input means to supply fluid under pressure to the second side of one diaphragm, each of said diaphragms having a movable part to take a deflection in accordance with the magnitude of said fluid pressure, said movable part of said one diaphragm having a portion; connection means to hold said diaphragm parts in fixed positions relative to each other; a spiral spring having inner and outer ends, said spring outer end being fixed relative to one of said portions; a shaft rotatably mounted in a fixed axial position on the other of said portions, said spiral spring being coiled around said shaft, said spring inner end being fixed relative to said shaft; and releasable means to fix said shaft in a selected position of its rotation to the said other portion, said spiral spring being constructed and mounted to apply a force to said one diaphragm in a direction toward said first side thereof, rotation of said shaft causing the said force to vary when said shaft is not fixed; and output means connected from said one diaphragm portion to said body for producing an output which is a predetermined function of said fluid pressure; and utilization means connected to said output means, said utilization means including a milliammeter calibrated in pounds per square inch, said outer spring end being fixed relative to said connection means, said shaft being rotatably mounted on said body portion, a worm gear fixed on said shaft, a worm rotatable in a fixed axial position on said body portion in mesh with said worm gear, and a set screw threaded in said body portion to move axially normal to the axis of said worm into engagement therewith, said worm being held in a fixed position relative to said body portion when said set screw is tightened thereagainst and is rotatable when said set screw is loosened sufficiently.

20. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure; and utilization means connected to said output means, said utilization means including a milliammeter calibrated in pounds per square inch, said first spring having a force constant at least of an order of magnitude less than that of said second spring, said first spring being also constructed and mounted to apply a force to said member in a direction toward the said other side thereof, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

21. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure, said first spring having a force constant at least of an order of magnitude less than that of said second spring, said first spring being also constructed and mounted to apply a force to said sensor in a direction toward the said other side thereof, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

22. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions; respectively; second means for fixing said second spring first and second ends relative to said portions, respectively, said first spring having a forces constant less than that of said second spring, said second spring being constructed and mounted to apply a force to said sensor in a direction toward the other side thereof; and output means connected from said sensor portion to said body for producing an output which is a predetermined function of said fluid pressure, said first spring having a force constant at least of an order of magnitude less than that of said second spring, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

23. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure, said first spring being also constructed and mounted to apply a force to said sensor in a direction toward the said other side thereof, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

24. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

25. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure; and utilization means connected to said output means, said first spring having a force constant at least of an order of magnitude less than that of said second spring, said first spring being also constructed and mounted to apply a force to said sensor in a direction toward the other side thereof, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

26. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure; and utilization means connected to said output means, said first spring having a force constant at least of an order of magnitude less than that of second spring, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and enagageable to allow said second spring first end to move relative to and to be fixed relative to the portion connectible therewith, respectively.

27. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure; and utilization means connected to said output means, said first spring being also constructed and mounted to apply a force to said sensor in a direction toward the said other side thereof, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

28. Apparatus for producing an output in accordance with the pressure of a fluid, said apparatus comprising: a body having a portion with an opening thereinto; a sensor having an annular part sealed and fixed relative to said body portion around said opening; input means to supply fluid under pressure at least to one side of said sensor to cause deflection and movement of one portion thereof as a function of said pressure; first and second springs each having first and second ends; first means for fixing said first spring first and second ends relative to said portions, respectively; second means for fixing said second spring first and second ends relative to said portions, respectively, said first spring having a force constant less than that of said second spring, said second spring being constructed and mounted to apply a force to said sensor in a direction toward the other side thereof; and output means connected from said sensor portion to said body for producing an output which is a predetermined function of said fluid pressure; and utilization means connected to said output means, said first means being releasable to allow movement of said first spring first end over a continuous range relative to the portion connectible therewith by said first means to vary the force supplied by said first spring, said first means being lockable anywhere over said range to hold the same at any selected one position therein, said second means being selectively releasable and engageable to allow said second spring first end to move relative to and to be fixed relative to the portion connectible therewith, respectively.

* * * * *